United States Patent
Ishino et al.

(10) Patent No.: US 12,459,560 B2
(45) Date of Patent: Nov. 4, 2025

(54) STEER-BY-WIRE STEERING SYSTEM

(71) Applicants: Toyota Jidosha Kabushiki Kaisha, Toyota (JP); JTEKT CORPORATION, Kariya (JP); DENSO CORPORATION, Kariya (JP)

(72) Inventors: Takahito Ishino, Numazu (JP); Masaharu Yamashita, Toyota (JP); Kenji Shibata, Nagoya (JP); Yosuke Yamashita, Nagoya (JP); Shintaro Takayama, Toyota (JP); Kazuaki Iida, Toyota (JP); Ryo Yamazaki, Okazaki (JP); Yuuta Kajisawa, Okazaki (JP); Kenichi Abe, Okazaki (JP); Toyohiro Hayashi, Kariya (JP); Nobuyori Nakajima, Kariya (JP); Hiroyasu Otake, Kariya (JP); Kurumi Tazuke, Kariya (JP); Hiroki Tomizawa, Kariya (JP)

(73) Assignees: TOYOTA JIDOSHA KABUSHIKI KAISHA, Toyota (JP); JTEKT CORPORATION, Kariya (JP); DENSO CORPORATION, Kariya (JP)

( * ) Notice: Subject to any disclaimer, the term of this patent is extended or adjusted under 35 U.S.C. 154(b) by 550 days.

(21) Appl. No.: 18/067,487

(22) Filed: Dec. 16, 2022

(65) Prior Publication Data
US 2023/0219618 A1    Jul. 13, 2023

(30) Foreign Application Priority Data
Jan. 7, 2022   (JP) ................. 2022-001538

(51) Int. Cl.
*B62D 5/04*   (2006.01)
*H02P 23/14*  (2006.01)
*H02P 29/68*  (2016.01)

(52) U.S. Cl.
CPC .......... *B62D 5/0496* (2013.01); *B62D 5/046* (2013.01); *H02P 23/14* (2013.01); *H02P 29/68* (2016.02)

(58) Field of Classification Search
CPC ...... B62D 5/0496; B62D 5/046; B62D 5/001; B62D 5/049; H02P 23/14; H02P 29/68
See application file for complete search history.

(56) References Cited

U.S. PATENT DOCUMENTS 9,231,465 B2 *   1/2016   Hara ................. B62D 5/0463
10,093,348 B2 *  10/2018  Hales ....................... H02P 5/74
(Continued)

FOREIGN PATENT DOCUMENTS

JP    2012-148629 A    8/2012

*Primary Examiner* — Drew J Brown
(74) *Attorney, Agent, or Firm* — Sughrue Mion, PLLC (57) ABSTRACT

A steer-by-wire steering system including a steering device including a steering motor and a controller configured to supply a steering current to the steering motor based on a steering request. The controller includes a plurality of microcomputers, a plurality of drive circuits, and a plurality of temperature sensors. When a detection temperature difference that is a difference between detection temperatures of any two of the plurality of temperature sensors is greater than a predetermined threshold, each of the plurality of microcomputers executes an independent calculation control to independently calculate and set a current limit value, which is an upper limit value of the steering current, based on a detection temperature of one of the plurality of temperature sensors corresponding to itself, irrespective of detection temperatures of one or more of the plurality of temperature sensors other than the one of the plurality of temperature sensors corresponding to itself.

12 Claims, 6 Drawing Sheets

(56) References Cited

U.S. PATENT DOCUMENTS

| | | | | |
|---|---|---|---|---|
| 10,848,093 | B2* | 11/2020 | Zhang | H02P 5/46 |
| 11,824,477 | B2* | 11/2023 | Morisaki | H02P 29/028 |
| 2011/0282551 | A1* | 11/2011 | Sasaki | B62D 5/065 |
| | | | | 701/42 |
| 2020/0059186 | A1* | 2/2020 | Kadowaki | B62D 5/04 |
| 2020/0189607 | A1* | 6/2020 | Wesenberg | B62D 5/003 |

* cited by examiner

FIG.1

VEHICLE FRONT SIDE

LEFT ←→ RIGHT

VEHICLE REAR SIDE

FIG.10

STEER-BY-WIRE STEERING SYSTEM

CROSS REFERENCE TO RELATED APPLICATION

The present application claims priority to Japanese Patent Application No. 2022-001538, which was filed on Jan. 7, 2022, the disclosure of which is herein incorporated by reference in its entirety.

BACKGROUND

Technical Field

The following disclosure relates to a steer-by-wire steering system.

Description of Related Art

A current limiting control for limiting a current to be supplied to a motor (hereinafter referred to as a steering current) is typically executed in a steering system when the temperature of the motor functioning as a drive source exceeds a threshold, so as to obviate a fault of the motor and a motor drive circuit due to heat generation. In a case where the temperature of the motor is not accurately estimated, the steering current may be undesirably limited even though the motor and the motor drive circuit are not in an overheated state, causing a possibility of a reduction in a motor torque. Japanese Patent Application Publication No. 2012-148629 discloses, for instance, an electric power steering device. In the disclosed device, when a difference between a present value and a previous value of a board temperature sensor is greater than a predetermined threshold, the previous value is stored as a reference value in estimating the temperature of the motor. In the disclosed device, the motor temperature is estimated based on the previous value, which is a value before the board temperature changes significantly, until it is determined that the board temperature sensor is abnormal. This configuration prevents the current limiting control from being executed at an early timing before the abnormality of the board temperature sensor is determined.

SUMMARY

The current limiting control based on the detection temperature of the temperature sensor is executed also in a steering system of a steer-by-wire type (hereinafter referred to as a steer-by-wire steering system) in which a steering motor steers one or more wheels independently of an operation force of an operating member. In a case where the current limiting control is executed in the steer-by-wire steering system, there may be a possibility that steering is not performed as intended by a driver because a maximum value of the steering current is limited and the operation force of the operation member does not directly contribute to steering of the one or more wheels in the steer-by-wire steering system.

The temperature sensor employed in the steer-by-wire steering system has a function of detecting a fault in which the detection temperature is fixed at a maximum value or a minimum value. When such a fixed fault of the temperature sensor is detected, a calculating portion (such as a microcomputer or an ECU) determines that the value of the detection temperature is abnormal, and the current limiting control can be prohibited.

The temperature sensor and the calculating portion do not have a function of detecting a drift fault in which the detection temperature is unstable between the maximum value and the minimum value. In a case where the current limiting control is executed due to the drift fault, there may be a possibility that turning accuracy is deteriorated at a timing when current limitation is actually unnecessary.

Accordingly, an aspect of the present disclosure relates to a steering system capable of preventing or minimizing a reduction in turning accuracy even when the temperature sensor becomes defective.

In one aspect of the present disclosure, a steer-by-wire steering system includes: a steering device including a steering motor and configured to steer one or more wheels mechanically independently of an operation force of an operating member; and a controller configured to supply a steering current to the steering motor based on a steering request to control the steering motor. The controller includes: a plurality of microcomputers communicably connected to each other, each of the plurality of microcomputers being configured to calculate a current value of the steering current based on the steering request; a plurality of drive circuits respectively corresponding to the plurality of microcomputers, each of the plurality of drive circuits being configured to supply the steering current to the steering motor based on control of a corresponding one of the plurality of microcomputers; and a plurality of temperature sensors respectively corresponding to the plurality of microcomputers, each of the plurality of temperature sensors being configured to detect a temperature of a corresponding one of the plurality of microcomputers. When a detection temperature difference that is a difference between detection temperatures of any two of the plurality of temperature sensors is greater than a predetermined threshold, each of the plurality of microcomputers executes an independent calculation control to independently calculate and set a current limit value, which is an upper limit value of the steering current, based on a detection temperature of one of the plurality of temperature sensors corresponding to itself, irrespective of detection temperatures of one or more of the plurality of temperature sensors other than the one of the plurality of temperature sensors corresponding to itself.

The steer-by-wire steering system according to the present disclosure is configured to obviate a reduction in the turning accuracy even when one temperature sensor suffers from the drift fault, based on the precondition that the chances of the plurality of temperature sensors simultaneously suffering from the drift fault are quite low. Specifically, it is detected in the present steer-by-wire steering system that the detection temperature of one temperature sensor has deviated from a normal detection temperature due to a fault such as the drift fault, by comparison with the detection temperatures of other normally operating temperature sensors. When the detection temperature difference is greater than the predetermined threshold, the controller estimates or determines that the one temperature sensor is defective and executes the independent calculation control.

In the independent calculation control, each microcomputer calculates the current limit value based on the detection temperature of one of the plurality of temperature sensors corresponding to itself, irrespective of the detection temperatures of one or more of the plurality of temperature sensors other than the one of the plurality of temperature sensors corresponding to itself. With this configuration, each of one or more of the plurality of microcomputers corresponding to the normally operating one or more of the plurality of temperature sensors determines the current limit value that matches the actual detection temperature. It is only the microcomputer corresponding to the defective temperature sensor that calculates the current limit value limited than necessary. That is, even if one temperature sensor becomes defective in a situation in which the actual temperature is not so high as to limit the current, the one or more of the plurality of microcomputers corresponding to the normally operating one or more of the plurality of temperature sensors do not unnecessarily lower the current limit value. Thus, the torque is prevented from being unnecessarily reduced due to the limitation of the steering current even when the one temperature sensor becomes defective, and the turning accuracy is accordingly prevented from being reduced.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Referring to the drawings, there will be described below in detail a steering system 1 according to one embodiment of the present disclosure. It is to be understood that the present disclosure is not limited to the details of the following embodiments but may be embodied with various changes and modifications based on the knowledge of those skilled in the art.

Figure 1:
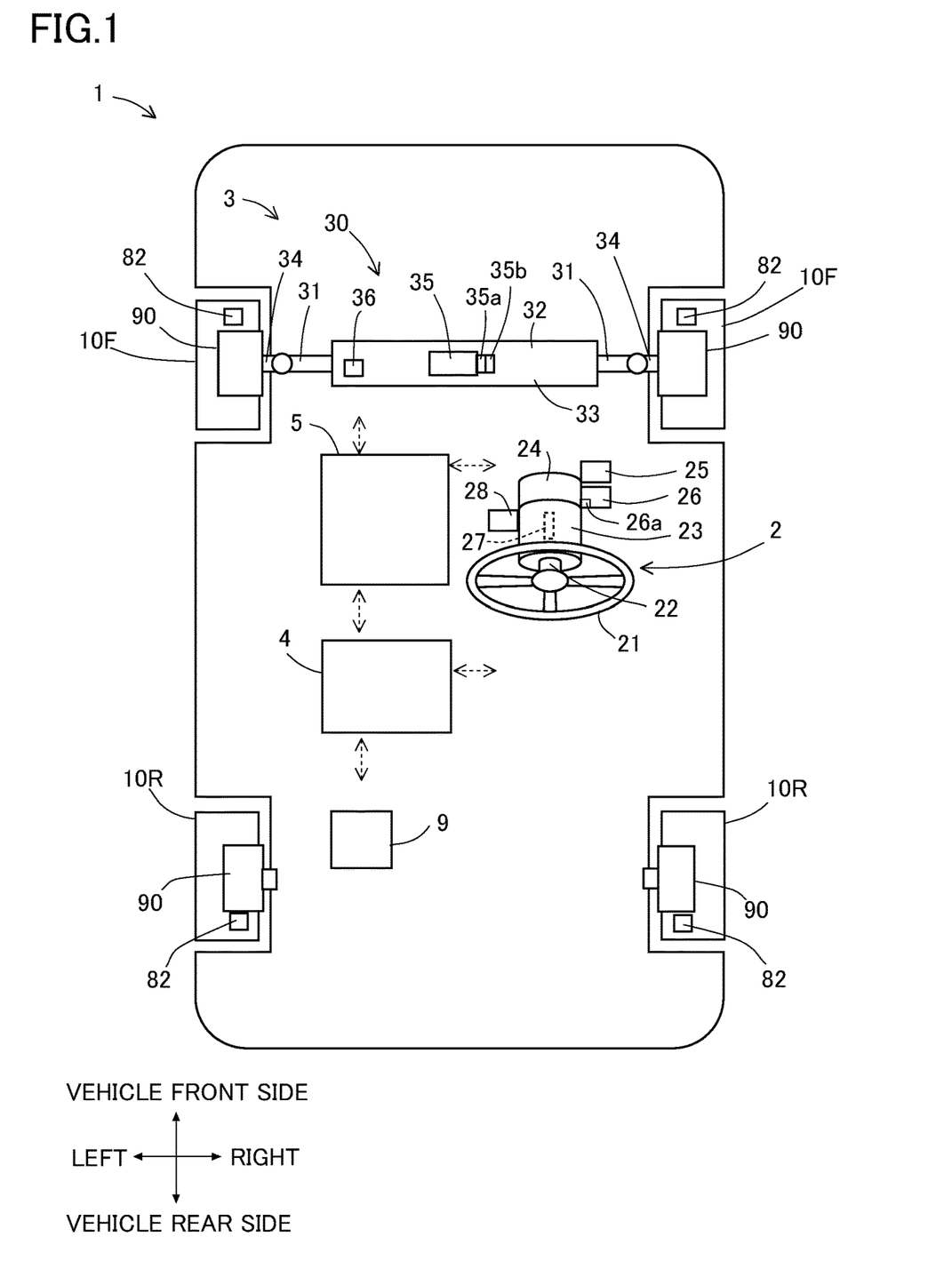
FIG. 1 is a view illustrating a configuration of a steering system according to one embodiment of the present embodiment.

As illustrated in FIG. 1, the steering system 1 according to the present embodiment includes an operation device 2 and a front-wheel steering device (corresponding to "steering device") 3, which are mechanically independent of each other. The front-wheel steering device 3 is configured to steer a pair of front wheels 10F. The steering system 1 further includes a steering ECU 5 (corresponding to "controller") configured to control the front-wheel steering device 3 based on a steering request. The steering system 1 is a steer-by-wire steering system. In the following description, the front wheels 10F and rear wheels 10R will be each referred to as a wheel 10 where appropriate. In the present embodiment, the rear wheels 10R are drive wheels.

Operation Device

The operation device 2 includes: a steering wheel 21 (as one example of an operating member) operable by a driver to steer the wheels 10; a steering shaft 22 to one end of which is attached the steering wheel 21; a steering column 23 rotatably holding the steering shaft 22 and supported by an instrument panel reinforcement (not illustrated); a reaction force applying mechanism 24; and an operation angle sensor 25.

The reaction force applying mechanism 24 is configured to apply, to the steering wheel 21 via the steering shaft 22, a reaction force against a steering operation by utilizing, as a force generation source, a reaction force motor 26 supported by the steering column 23. The reaction force motor 26 is an electric motor. Hereinafter, the reaction force against the steering operation may also be referred to as "operation reaction force" where appropriate. The reaction force applying mechanism 24 has an ordinary configuration including a speed reducer, etc. The reaction force motor 26 is provided with a rotational angle sensor 26a. The operation angle sensor 25 is configured to detect an operation angle of the steering wheel 21 as a steering operation amount.

In the steering system 1, a torsion bar 27 is incorporated in the steering shaft 22, as in typical power steering systems. The operation device 2 includes an operation torque sensor 28 for detecting an operation torque based on a torsional amount of the torsion bar 27. The operation torque corresponds to an operation force applied to the steering wheel 21 by the driver.

Front-Wheel Steering Device

The wheels 10 are supported by a body of the vehicle via respective steering knuckles 90 such that the wheels 10 are turnable or steerable. The steering knuckles 90 are constituent elements of respective suspension devices. The front-wheel steering device 3 rotates the steering knuckles 90 to thereby steer the front wheels 10F together. The front-wheel steering device 3 includes a steering actuator 30 as a main constituent element.

The steering actuator 30 includes a steering rod 31, a housing 32, a rod moving mechanism 33, and a steering motor 35. The steering rod 31, which is also referred to as "rack bar", has opposite ends coupled to the right and left steering knuckles 90 via respective link rods 34. The housing 32 is fixedly held by the vehicle body and supports the steering rod 31 movably in the right-left direction.

The rod moving mechanism 33 is configured to move the steering rod 31 in the right-left direction utilizing a steering motor 35 as a drive source. The steering motor 35 is an electric motor. The rod moving mechanism 33 is constituted mainly by a ball screw mechanism including a ball groove formed on the steering rod 31 and a nut that is in engagement with the ball groove via bearing balls and that is rotated by the steering motor 35. The rod moving mechanism 33 has an ordinary configuration, a detailed description of which is dispensed with.

The steering motor 35 is provided with a rotational angle sensor 35a and a current sensor 35b for detecting a current supplied to the steering motor 35. The front-wheel steering device 3 includes a steering angle sensor 36 for detecting an amount of the movement of the steering rod 31 in the right-left direction from its neutral position to thereby detect a steering angle, i.e., a steering amount, of the front wheels 10F. As described above, the front-wheel steering device 3 is mechanically independent of the operation force of the steering wheel 21 and constitutes a steering device of a steer-by-wire type for steering the front wheels 10F based on the force of the steering motor 35.

The steering ECU 5 is an electronic control unit including at least one CPU, at least one memory, etc. The steering ECU 5 is communicably connected to the devices and the sensors via communication lines (not illustrated). A CAN (car area network or controllable area network) is used for communication in the vehicle. The vehicle is equipped with an automated driving ECU 9 configured to execute a control relating to automated driving. The vehicle is further equipped with various sensors such as wheel speed sensors 82.

The steering ECU 5 executes a steering control for steering the front wheels 10F based on a steering request, namely, based on the operation angle of the steering wheel 21 in manual driving or based on a command from the automated driving ECU 9 in automated driving. The steering ECU 5 obtains the operation angle of the steering wheel 21 based on a rotational angle of the reaction force motor 26 detected by the rotational angle sensor 26a. Based on the operation angle, the steering ECU 5 determines a target front-wheel steering angle, which is a target of the steering angle of the front wheels 10F.

Based on the target front-wheel steering angle, the steering ECU 5 determines a target rotational angle, which is a target of a rotational angle of the steering motor 35. The steering ECU 5 detects an actual rotational angle of the steering motor 35 via the rotational angle sensor 35a and determines a rotational angle deviation, which is a deviation of the actual rotational angle with respect to the target rotational angle. Here, the torque generated by the steering motor 35 is referred to as a steering torque. The steering ECU 5 determines the steering torque to be generated, according to a feedback control law based on the rotational angle deviation.

Here, a current supplied to the steering motor 35 is referred to as a steering current. The steering torque and the steering current are generally proportional to each other. According to the relationship, the steering ECU 5 determines the steering current to be supplied to the steering motor 35 based on the steering torque determined as described above and supplies the steering current to the steering motor 35.

The steering system 1 further includes a reaction force ECU 4 configured to execute a reaction force control for giving, to the driver, an operation feeling with respect to the steering operation. The reaction force ECU 4 determines the operation reaction force based on two components, i.e., a steering-load-dependent component FS and an operation-force-dependent reduction component FA. The steering-load-dependent component FS is a component relating to a steering force (the steering torque of the steering motor 35) necessary for steering the front wheels 10F. The steering-load-dependent component FS is determined based on the steering current being supplied to the steering motor 35. Though not described in detail, it is recognized that the steering load of the front wheels 10F increases with an increase in the current value of the steering current, and the steering-load-dependent component FS is determined to be a great value.

The operation-force-dependent reduction component FA may be considered as a component for giving, to the driver, an operation feeling in what is called power steering system. In the power steering system, an assist torque corresponding to the operation torque is applied to the steering shaft 22.

The reaction force ECU 4 detects the operation torque via the operation torque sensor 28. Based on the operation reaction force, the reaction force ECU 4 determines a reaction force current, which is a current to be supplied to the reaction force motor 26, and supplies the determined reaction force current to the reaction force motor 26.

Detailed Configuration of Steering ECU

Figure 2:
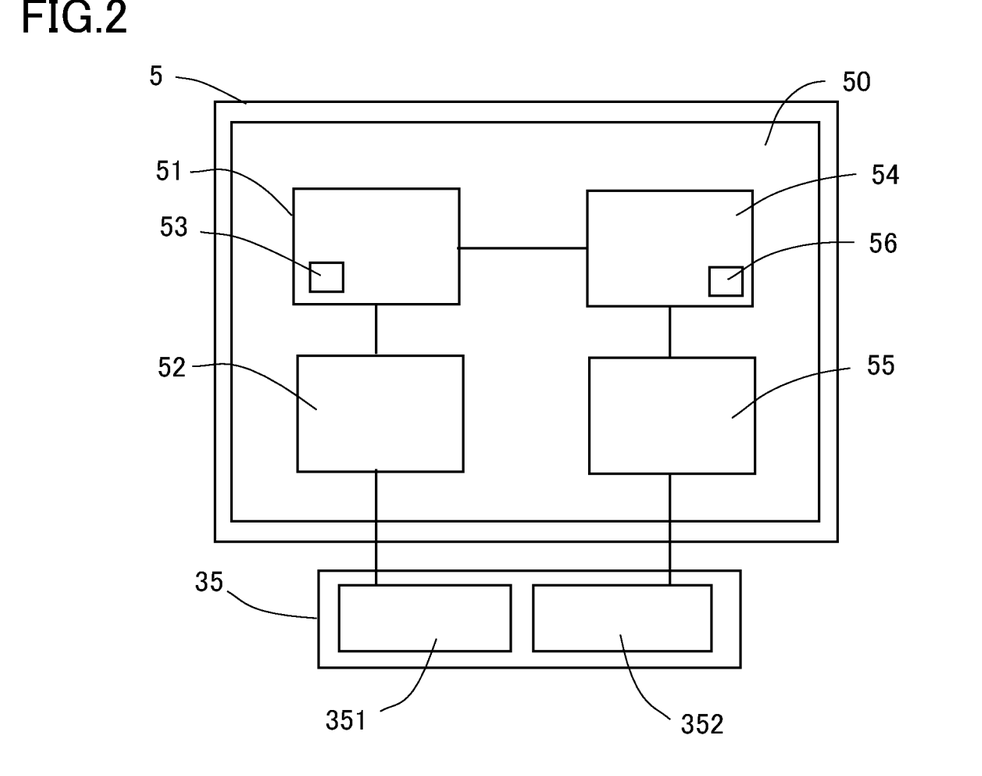
FIG. 2 is a view illustrating a configuration of a steering ECU of the embodiment.

As illustrated in FIG. 2, the steering ECU 5 mainly includes a first microcomputer 51, a first drive circuit 52, a first temperature sensor 53, a second microcomputer 54, a second drive circuit 55, and a second temperature sensor 56. The first microcomputer 51 and the second microcomputer 54 function as a first calculating portion and a second calculating portion, respectively. The first microcomputer 51 is a microcomputer disposed on a board 50 and including a CPU, a memory, etc. The first microcomputer 51 determines a current value of a first steering current supplied to the steering motor 35 via the first drive circuit 52. The first microcomputer 51 controls, according to PWM control, for instance, the first drive circuit 52 such that the first steering current is supplied to the steering motor 35.

The first drive circuit 52 is a motor drive circuit for driving the steering motor 35 and includes a plurality of switching elements corresponding to the three phases of the steering motor 35. The first drive circuit 52 is disposed on the board 50 and communicably connected to the first microcomputer 51. The first drive circuit 52 supplies an electric power of a battery (not illustrated) to the steering motor 35 based on control of the first microcomputer 51.

The first temperature sensor 53 is a temperature sensor for detecting a temperature of the first microcomputer 51. The first temperature sensor 53 is disposed in the first microcomputer 51. The first temperature sensor 53 is communicably connected to the first microcomputer 51 to transmit information on a detection temperature (detection result) to the first microcomputer 51. It is noted that the first temperature sensor 53 may be disposed on the board 50 in the vicinity of the first microcomputer 51 within a range in which the temperature of the first microcomputer 51 is detectable or estimatable.

Like the first microcomputer 51, the second microcomputer 54 is a microcomputer disposed on the board 50 and including a CPU, a memory, etc. The second microcomputer 54 determines a current value of a second steering current supplied to the steering motor 35 via the second drive circuit 55. The second microcomputer 54 controls, according to PWM control, for instance, the second drive circuit 55 such that the second steering current is supplied to the steering motor 35. The first microcomputer 51 and the second microcomputer 54 are communicably connected to each other.

The second drive circuit 55 is a motor drive circuit for driving the steering motor 35 and includes a plurality of switching elements corresponding to the three phases of the steering motor 35. The second drive circuit 55 is disposed on the board 50 and communicably connected to the second microcomputer 54. The second drive circuit 55 supplies the electric power of the battery (not illustrated) to the steering motor 35 based on control of the second microcomputer 54.

The second temperature sensor 56 is a temperature sensor for detecting a temperature of the second microcomputer 54. The second temperature sensor 56 is disposed in the second microcomputer 54. The second temperature sensor 56 is communicably connected to the second microcomputer 54 to transmit information on a detection temperature (detection result) to the second microcomputer 54. It is noted that the second temperature sensor 56 may be disposed on the board 50 in the vicinity of the second microcomputer 54 within a range in which the temperature of the second microcomputer 54 is detectable or estimatable.

The steering motor 35 is a double-winding electric motor including a winding wire 351 connected to the first drive circuit 52 and a winding wire 352 connected to the second drive circuit 55. That is, the steering motor 35 is configured to output the steering torque corresponding to a sum of the first steering current supplied from the first drive circuit 52 and the second steering current supplied from the second drive circuit 55. The sum of the first steering current and the second steering torque may be referred to as a total steering current. The steering current supplied from the battery via the steering ECU 5 is a sum of the first steering current and the second steering current.

For ensuring redundancy with respect to driving of the steering motor 35, the first microcomputer 51 and the second microcomputer 54 of the steering ECU 5 execute mutually equivalent calculations all the time. The first microcomputer 51 and the second microcomputer 54 transmit and receive the information on calculation results to and from each other. In case of a fault of one of the calculating portions (one of the microcomputers), the other of the calculating portions (the other of the microcomputers) can drive the steering motor 35. In the present embodiment, the first microcomputer 51 is a master microcomputer, and the second microcomputer 54 is a slave microcomputer.

Current Limitation for Protection from Overheating

Figure 3:
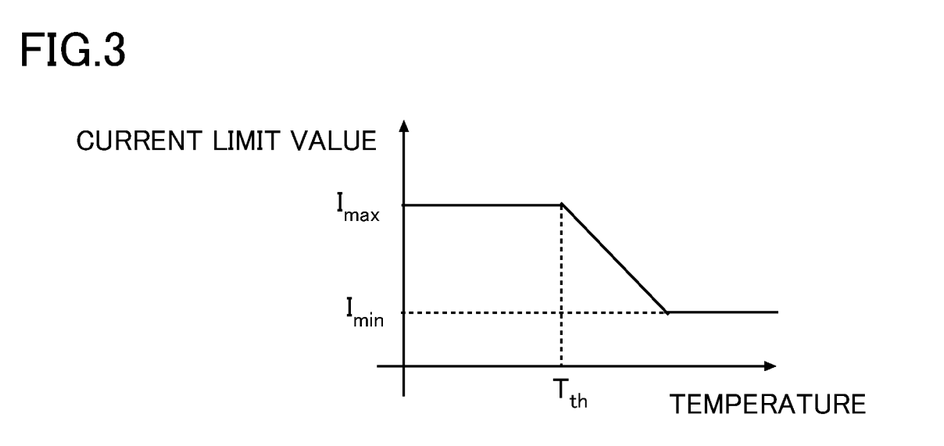
FIG. 3 is a conceptual view illustrating a limit value map in the embodiment.

For protection of the ECU from overheating, the steering ECU 5 is configured to be capable of executing a current limiting control for lowering an upper limit value of the steering current when the detection temperature exceeds a predetermined threshold temperature $T_{th}$. As illustrated in FIG. 3, the steering ECU 5 stores a limit value map indicating a current limit value, i.e., an upper limit value, with respect to the temperature of the ECU or the microcomputer. The current limit value is an upper limit value of the current value of the steering current that is allowed to be supplied from the steering ECU 5 to the steering motor 35, i.e., an allowable maximum value.

The steering ECU 5 sets the current limit value based on the detection temperature of the first temperature sensor 53 and the detection temperature of the second temperature sensor 56. When the detection temperature exceeds the threshold temperature $T_{th}$, the current limit value is gradually lowered to a minimum value $I_{min}$ with an increase in the detection temperature and thereafter becomes constant at the minimum value $I_{min}$ when the detection temperature becomes equal to or higher than a certain temperature. In FIG. 3, the maximum value $I_{max}$ is set to a maximum current value that can flow through each drive circuit 52, 55, for instance, and the minimum value $I_{min}$ is set to a minimum current value that can flow through each drive circuit 52, 55, for instance. In FIG. 3, the minimum value $I_{min}$ is a value less than 50% of the maximum value $I_{max}$. The steering motor 35 outputs a maximum steering torque when the steering current of the maximum value $I_{max}$ is supplied to the steering motor 35.

There are set, for the steering ECU 5 of the present embodiment, a coordinated calculation control and an independent calculation control each as an operation mode of the system (that may also be referred to as a calculation mode of the steering current). In other words, the steering ECU 5 is configured to execute the coordinated calculation control and the independent calculation control at mutually different timings.

Coordinated Calculation Control

The coordinated calculation control is a control (an operation mode) in which each of the first microcomputer 51 and the second microcomputer 54 sets the current limit value based on a detection temperature $T_1$ of the first temperature sensor 53 and a detection temperature $T_2$ of the second temperature sensor 56. In the coordinated calculation control, the current limit value set by the microcomputer 51 and the current limit value set by the microcomputer 54 are the same. In the coordinated calculation control, the steering current set by the microcomputer 51 and the steering current set by the microcomputer 54 are the same.

In the coordinated calculation control, each of the first microcomputer 51 and the second microcomputer 54 calculates the current limit value based on a higher one of the detection temperatures $T_1$, $T_2$. The coordinated calculation control may be referred to as a control in which the second microcomputer 54 calculates the current value of the second steering current utilizing the calculation result of the first microcomputer 51. Further, the coordinated calculation control may be referred to as a control in which a plurality of calculating portions (a plurality of microcomputers) cooperates with each other to calculate the steering current.

Figure 4:
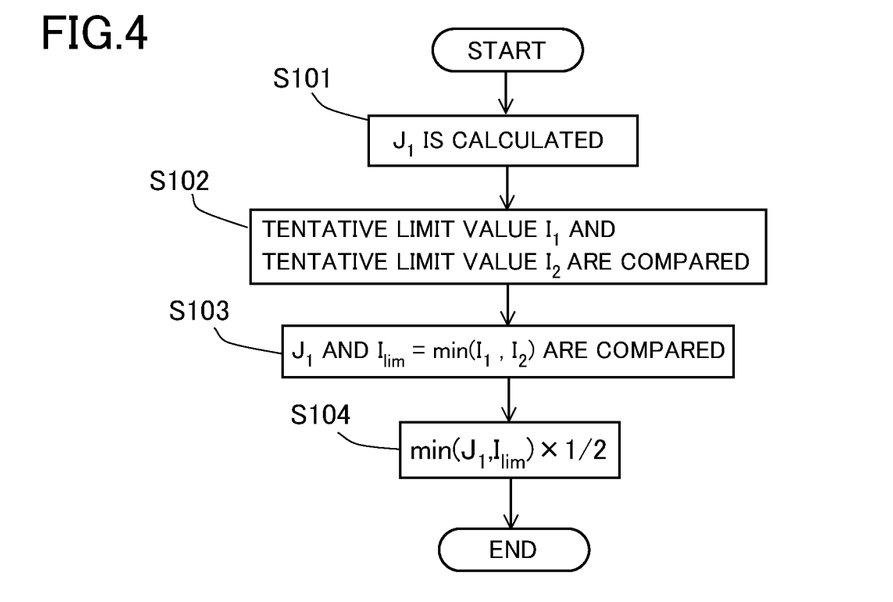
FIG. 4 is a flowchart for explaining a coordinated calculation control executed by a first calculating portion in the embodiment.

As illustrated in FIG. 4, the first microcomputer 51 calculates a current value $J_1$ of the steering current corresponding to the steering request (S101) when receiving the steering request, namely, when receiving the operation angle of the steering wheel 21 in manual driving or when receiving the command from the automated driving ECU 9 in automated driving. The current value calculated based on the steering request will be hereinafter referred to as "calculated value" where appropriate. The first microcomputer 51 sets a current limit value $I_{lim}$ (S102) as described later and compares the calculated value $J_1$ and the current limit value $I_{lim}$ (S103).

Figure 5:
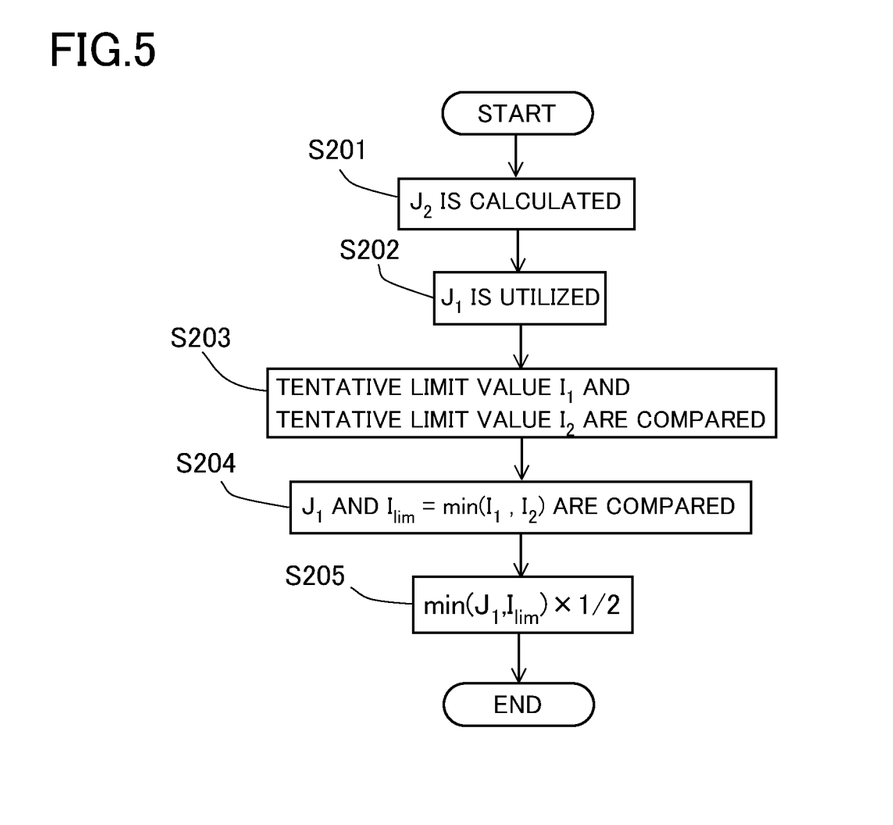
FIG. 5 is a flowchart for explaining a coordinated calculation control executed by a second calculating portion in the embodiment.

Like the first microcomputer 51, the second microcomputer 54 calculates a current value $J_2$ of the steering current corresponding to the steering request (S201) when receiving the steering request, as illustrated in FIG. 5. The second microcomputer 54 receives information on the calculated value $J_1$ from the first microcomputer 51. In the coordinated calculation control, the second microcomputer 54 sets the calculated value $J_1$ of the first microcomputer 51 as the calculated value to be utilized by the second microcomputer 54 (S202). That is, the second microcomputer 54 calculates the current value of the second steering current in the coordinated calculation control based on the calculated value $J_1$ of the first microcomputer 51, namely, utilizing the calculated value $J_1$ of the first microcomputer 51. The second microcomputer 54 sets the current limit value $I_{lim}$ (S203) as described later and compares the calculated value $J_1$ and the current limit value $I_{lim}$ (S204).

The first microcomputer 51 calculates, as a tentative limit value $I_1$, the current limit value corresponding to the detection temperature $T_1$ of the first temperature sensor 53 based on the limit value map. Similarly, the second microcomputer 54 calculates, as a tentative limit value $I_2$, the current limit value corresponding to the detection temperature $T_2$ of the second temperature sensor 56 based on the limit value map. The first microcomputer 51 and the second microcomputer 54 transmit and receive information on the tentative limit values to and from each other. In the coordinated calculation control, each of the first microcomputer 51 and the second microcomputer 54 sets a lower one of the tentative limit value $I_1$ and the tentative limit value $I_2$ as the current limit value (S102, S203). In other words, in the coordinated calculation control, each of the first microcomputer 51 and the second microcomputer 54 sets the current limit value that corresponds to a higher one of the detection temperature of the first temperature sensor 53 and the detection temperature of the second temperature sensor 56 as the current limit value $I_{lim}$, which is common to the first microcomputer 51 and the second microcomputer 54.

Each of the first microcomputer 51 and the second microcomputer 54 sets a lower one of the calculated value $J_1$ and the current limit value $I_{lim}$ as the current value of the steering current (hereinafter referred to as "command value" where appropriate). Each of the first microcomputer 51 and the second microcomputer 54 sets, as the steering current thereof (S104, S205), a value $I_e$ obtained by multiplying the command value by ½ (hereinafter referred to as "final calculated value $I_e$" where appropriate). The first microcomputer 51 sets the final calculated value $I_e$ as the current value of the first steering current and controls the first drive circuit 52 such that the first steering current is supplied to the winding wire 351 of the steering motor 35. The second microcomputer 54 sets the final calculated value $I_e$ as the current value of the second steering current and controls the second drive circuit 55 such that the second steering current is supplied to the winding wire 352 of the steering motor 35.

In the coordinated calculation control, the first steering current and the second steering current are the same current value. A sum of the first steering current and the second steering current is equal to a lower one of the calculated value $J_1$ and the current limit value $I_{lim}$, i.e., $\min(J_1, I_{lim})$. In the coordinated calculation control, therefore, there is supplied, to the steering motor 35, the steering current whose current value is set to the calculated value $J_1$ based on the steering request or the steering current whose current value is limited to the current limit value $I_{lim}$. The current value of the steering current supplied to the steering motor 35 in the coordinated calculation control is set to the calculated value $J_1$ when the calculated value $J_1$ is less than the current limit value $I_{lim}$ and set to the current limit value $I_{lim}$ when the calculated value $J_1$ is not less than the current limit value $I_{lim}$. It is noted that the coordinated calculation control may also be referred to as a coordinated operation mode or a first operation mode.

Independent Calculation Control

The independent calculation control is a control (an operation mode) in which the first microcomputer 51 and the second microcomputer 54 calculate respectively the current values of the steering currents, i.e., the first steering current and the second steering current, independently of each other. That is, in the independent calculation control, the first microcomputer 51 independently calculates the current value of the first steering current irrespective of the calculation result of the second microcomputer 54, and the second microcomputer 54 independently calculates the current value of the second steering current irrespective of the calculation result of the first microcomputer 51. In the independent calculation control, the final calculated value $I_e$ as the calculation result of the first microcomputer 51 and the final calculated value $I_e$ as the calculation result of the second microcomputer 54 may differ from each other. In the independent calculation control, the microcomputers 51, 54 can set mutually different current limit values. In the independent calculation control, the microcomputers 51, 54 can set the respective steering currents that are mutually different from each other.

Figure 6:
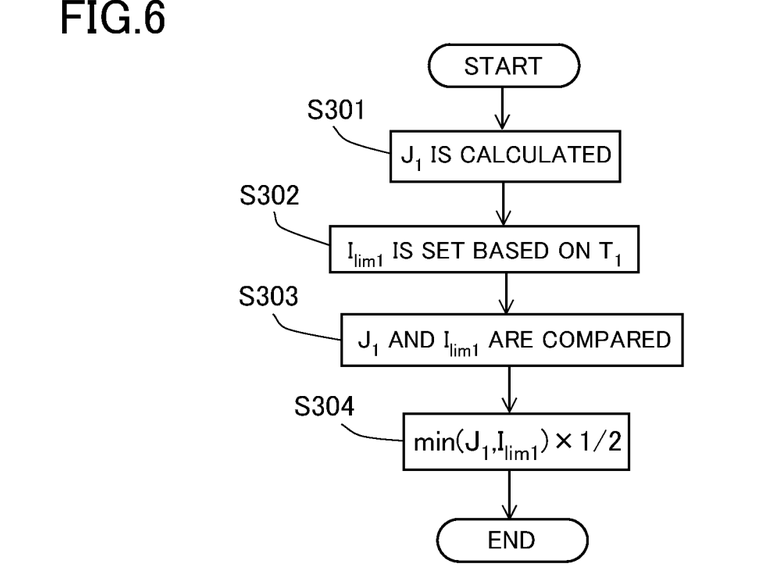
FIG. 6 is a flowchart for explaining an independent calculation control executed by the first calculating portion in the embodiment.

In the independent calculation control, the first microcomputer 51 calculates the current value (calculated value) $J_1$ of the steering current corresponding to the steering request (S301), as illustrated in FIG. 6. The first microcomputer 51 utilizes the calculated value $J_1$ for calculating the first steering current, irrespective of the calculated value $J_2$, which is the calculation result of the second microcomputer 54.

The first microcomputer 51 sets, as the first current limit value $I_{lim1}$, the current limit value corresponding to the detection temperature $T_1$ of the first temperature sensor 53 based on the limit value map (S302). The first current limit value $I_{lim1}$ is a value corresponding to the tentative limit value $I_1$ in the coordinated calculation control. In the independent calculation control, the first microcomputer 51 sets the current limit value, i.e., the first current limit value $I_{lim1}$, based on the detection temperature $T_1$ of the first temperature sensor 53, irrespective of the current limit value calculated by the second microcomputer 54 based on the detection temperature $T_2$ of the second temperature sensor 56, i.e., a second current limit value $I_{lim2}$.

The first microcomputer 51 compares the calculated value $J_1$ and the first current limit value $I_{lim1}$ (S303). The first microcomputer 51 sets, as the current value of the first steering current, a value $I_{e1}$ (first final calculated value $I_{e1}$) obtained by multiplying a lower one of the calculated value $J_1$ and the first current limit value $I_{lim1}$ (i.e., the command value) by ½ (S304). That is, the first microcomputer 51 controls the first drive circuit 52 such that the first steering current set as described above is supplied to the winding wire 351 of the steering motor 35.

Figure 7:
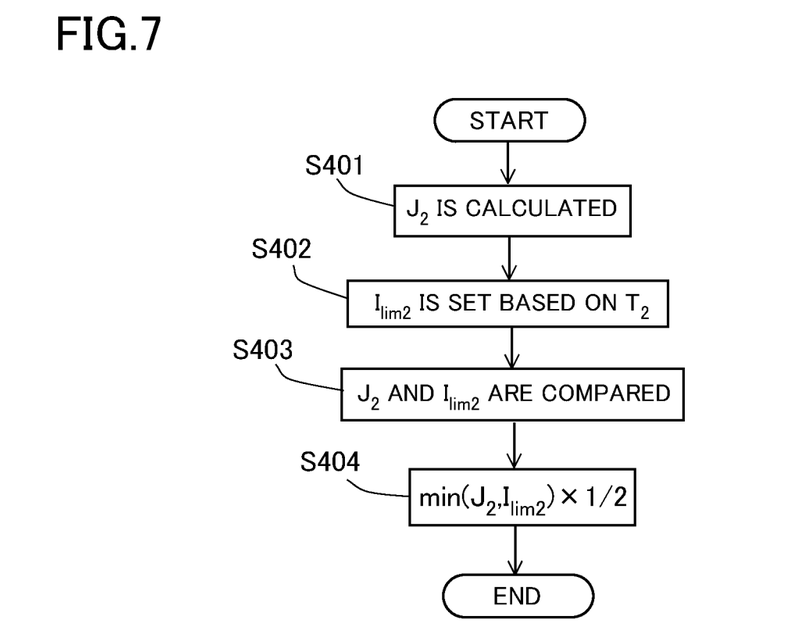
FIG. 7 is a flowchart for explaining an independent calculation control executed by the second calculating portion in the embodiment.

Like the first microcomputer 51, the second microcomputer 54 calculates the current value (calculated value) $J_2$ of the steering current corresponding to the steering request, as illustrated in FIG. 7 (S401). In the independent calculation control, the second microcomputer 54 utilizes the calculated value $J_2$ for calculating the second steering current, irrespective of the calculated value $J_1$, which is the calculation result of the first microcomputer 51. In this respect, the steering request input to the first microcomputer 51 and the second microcomputer 54 is the same therebetween, so that the calculated value $J_1$ and the calculated value $J_2$ are the same value.

The second microcomputer 54 sets, as the second current limit value $I_{lim2}$, the current limit value corresponding to the detection temperature $T_2$ of the second temperature sensor 56 based on the limit value map (S402). The second current limit value $I_{lim2}$ corresponds to the tentative limit value $I_2$ in the coordinated calculation control. In the independent calculation control, the second microcomputer 54 sets the current limit value based on the detection temperature $T_2$ of the second temperature sensor 56, irrespective of the first current limit value $I_{lim1}$.

The second microcomputer 54 compares the calculated value $J_2$ and the second current limit value $I_{lim2}$ (S403). The second microcomputer 54 sets, as the current value of the second steering current, a value $I_{e2}$ (second final calculated value $I_{e2}$) obtained by multiplying a lower one of the calculated value $J_2$ and the second current limit value $I_{lim2}$ (i.e., the command value) by ½ (S404). The second microcomputer 54 controls the second drive circuit 55 such that the second steering current set as described above is supplied to the winding wire 352 of the steering motor 35. The first current limit value $I_{lim1}$ and the second current limit value $I_{lim2}$ sometimes differ from each other because the detection temperature may differ between the first temperature sensor 53 and the second temperature sensor 56. Accordingly, the current value of the first steering current and the current value of the second steering current sometimes differ from each other in the independent calculation control. It is noted that the independent calculation control may be referred to as an independent operation mode or a second operation mode.

The current value of the steering current in the independent calculation control differs depending on cases as described below. In a case where the calculated value $J_1$ is less than the first current limit value $I_{lim1}$ and the calculated value $J_2$ is less than the second current limit value $I_{lim2}$, the current value of the steering current is equal to a sum of "$J_1 \times \frac{1}{2}$" and "$J_2 \times \frac{1}{2}$". In a case where the calculated value $J_1$ is not less than the first current limit value $I_{lim1}$ and the calculated value $J_2$ is less than the second current limit value $I_{lim2}$, the current value of the steering current is equal to a sum of "$I_{lim1} \times \frac{1}{2}$" and "$J_2 \times \frac{1}{2}$". In a case where the calculated value $J_1$ is less than the first current limit value $I_{lim1}$ and the calculated value $J_2$ is not less than the second current limit value $I_{lim2}$, the current value of the steering current is equal to a sum of "$J_1 \times \frac{1}{2}$" and "$I_{lim2} \times \frac{1}{2}$". In a case where the calculated value $J_1$ is not less than the first current limit value $I_{lim1}$ and the calculated value $J_2$ is not less than the second current limit value $I_{lim2}$, the current value of the steering current is equal to a sum of "$I_{lim1} \times \frac{1}{2}$" and "$I_{lim2} \times \frac{1}{2}$". Here, the former one of the two values each enclosed with the quotation marks indicates the current value of the first steering current while the latter indicates the current value of the second steering current.

Switchover of Calculation Controls

The first microcomputer 51 and the second microcomputer 54 share the respective calculation results and the information on the detection temperatures through communication. Each of the first microcomputer 51 and the second microcomputer 54 obtains the information on the detection temperature of the first temperature sensor 53 and the information on the detection temperature of the second temperature sensor 56. Upon switching of the operation modes, each of the first microcomputer 51 and the second microcomputer 54 calculates a detection temperature difference $\Delta T$ ($\Delta T = |T_1 - T_2|$), which is a difference between the detection temperature $T_1$ of the first temperature sensor 53 and the detection temperature $T_2$ of the second temperature sensor 56.

The first microcomputer 51 and the second microcomputer 54 execute the coordinated calculation control when the detection temperature difference $\Delta T$ is not greater than a predetermined threshold $\Delta T_{th}$. When the detection temperature difference $\Delta T$ is greater than the predetermined threshold $\Delta T_{th}$, the first microcomputer 51 and the second microcomputer 54 execute the independent calculation control. In other words, when the detection temperature difference $\Delta T$ is not greater than the predetermined threshold $\Delta T_{th}$, the steering ECU 5 sets the operation mode to the coordinated calculation control. When the detection temperature difference $\Delta T$ is greater than the predetermined threshold $\Delta T_{th}$, the steering ECU 5 sets the operation mode to the independent calculation control. The steering ECU 5 determines that the detection temperature difference $\Delta T$ is greater than the predetermined threshold $\Delta T_{th}$ when the detection temperature difference $\Delta T$ continues to be greater than the predetermined threshold $\Delta T_{th}$ for a predetermined length of time, for instance.

The first temperature sensor 53 and the second temperature sensor 56 are disposed in the same ECU, especially on the same board 50 in the present embodiment. If both the first temperature sensor 53 and the second temperature sensor 56 are normal, it can be estimated that the first temperature sensor 53 and the second temperature sensor 56 detect the same degree of temperature. That is, when both the first temperature sensor 53 and the second temperature sensor 56 are normal, the detection temperature difference $\Delta T$ is small. Thus, when the first temperature sensor 53 and the second temperature sensor 56 are normal, the coordinated calculation control is executed, so that the current value of the first steering current and the current value of the second steering current are the same. If the detection temperature of at least one of the first temperature sensor 53 and the second temperature sensor 56 exceeds the threshold temperature $T_{th}$ in a situation in which the coordinated calculation control is being executed, the current limit value calculated by the first microcomputer 51 and the current limit value calculated by the second microcomputer 54 are both lowered by the current limiting control based on the limit value map.

When the detection temperature difference $\Delta T$ is greater than the predetermined threshold $\Delta T_{th}$, on the other hand, it is highly probable that one of the temperature sensors is defective. If the coordinated calculation control continues to be executed in this case, a common current limit value that corresponds to a relatively higher one of the detection temperatures is set in both the calculation of the current value of the first steering current and the calculation of the current value of the second steering current. As a result, the current value of the first steering current and the current value of the second steering current are both limited by the common current limit value set at a lower value. If the detection temperature becomes higher than that in a normal condition due to an occurrence of the drift fault in one of the temperature sensors, the current value of the steering current is lowered even though the actual temperature is not so high, causing a possibility that the turning accuracy is reduced due to a reduction in the torque.

In the present embodiment, however, the calculation control (the operation mode) of the microcomputer is switched from the coordinated calculation control to the independent calculation control when the detection temperature difference $\Delta T$ is greater than the predetermined threshold $\Delta T_{th}$. With this configuration, it is only one of the microcomputers that sets the current limit value not matching the actual temperature due to the detection temperature of the defective temperature sensor. The other of the microcomputers can set the steering current based on the current limit value similar to that in the normal condition. That is, execution of the independent calculation control enables at least one of the microcomputers to calculate the steering current as in the normal condition, thus preventing the steering current from being lowered due to the detection of the temperature different from the actual temperature. In the present embodiment, the steering current is prevented from being lowered in situations not suitable for the purpose of the current limiting control, i.e., protection from overheating, so that the turning accuracy with respect to the steering request is prevented from being reduced.

Here, a case is considered in which the detection temperature of only the first temperature sensor 53 is higher than the threshold temperature $T_{th}$ and the detection temperature difference $\Delta T$ is accordingly greater than the predetermined threshold $\Delta T_{th}$, for instance. In this case, the calculation control is switched from the coordinated calculation control to the independent calculation control. The first microcomputer 51 sets the first current limit value $I_{lim1}$ to the minimum value $I_{min}$, for instance, based on the limit value map, and calculates the current value of the first steering current. The second microcomputer 54 sets the second current limit value $I_{lim2}$ to the maximum value $I_{max}$ and calculates the current value of the second steering current. If the utmost steering torque is required, the current value of the first steering current is equal to a value ($I_{min} \times \frac{1}{2}$) that is half the limited minimum value $I_{min}$ while the current value of the second steering current is equal to a value ($I_{max} \times \frac{1}{2}$) that is half the maximum value $I_{max}$. The value that is half the maximum value $I_{max}$ is equal to a half (50%) of a maximum outputtable value of the steering current. That is, even in a situation in which the maximum output is required, the independent calculation control enables the current value of the steering current, which is a sum of the first steering current and the second steering current, to be set to a value not less than 50% of the maximum output. If the output equal to 50% of the maximum output is ensured, no torque shortage occurs, thus preventing a reduction in the turning accuracy. The same advantages are obtained also in a case where the detection temperature of only the second temperature sensor 56 is higher than the threshold temperature $T_t h$. It is noted that the chances of both the temperature sensors 53, 56 simultaneously suffering from the drift fault are quite low.

Summary of Advantages of Present Embodiment

The steering system 1 according to the present embodiment is configured such that the first microcomputer 51 and the second microcomputer 54 execute the independent calculation control when the detection temperature difference $\Delta T$ is greater than the predetermined threshold $\Delta T_{th}$. With this configuration, it is detected that the detection temperature of one temperature sensor has deviated from a normal detection temperature due to the fault such as the drift fault, by comparison with the detection temperature of the other normally operating temperature sensor. Specifically, when the detection temperature difference is greater than the predetermined threshold, the steering ECU 5 estimates or determines that the one temperature sensor is defective and executes the independent calculation control. Thus, the steering system 1 according to the present embodiment is configured to obviate a reduction in the turning accuracy even when one temperature sensor suffers from the drift fault based on the precondition that the chances of the plurality of temperature sensors simultaneously suffering from the drift fault are quite low.

In the independent calculation control, each microcomputer 51, 54 calculates the current limit value based on the detection temperature of the temperature sensor 53, 56 corresponding to itself, irrespective of the detection temperature of the temperature sensor 53, 56 corresponding to the other microcomputer 51, 54. Thus, the microcomputer 51, 54 corresponding to the normally operating temperature sensor 53, 56 sets the current limit value that matches the actual detection temperature. It is only the microcomputer 51, 54 corresponding to the defective temperature sensor 53, 56 that calculates the current limit value limited than necessary. In the present embodiment, therefore, even when one temperature sensor 53, 56 is defective in a situation in which the actual temperature is not so high as to limit the current, the microcomputer 51, 54 corresponding to the normally operating temperature sensor 53, 56 does not unnecessarily lower the current limit value. With this configuration, even when one temperature sensor 53, 56 suffers from a fault, the torque is prevented from being unnecessarily reduced due to the limitation of the steering current, thus obviating a reduction in the turning accuracy.

Addition of Switching Conditions

Figure 8:
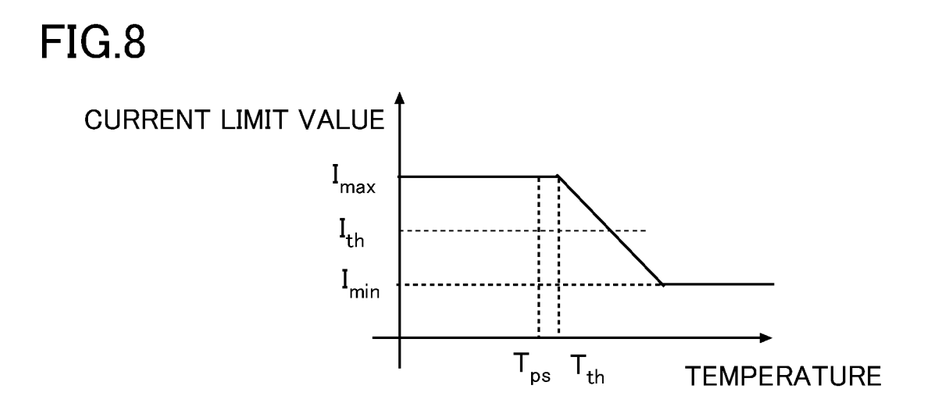
FIG. 8 is a conceptual view illustrating a limit value map in the embodiment.

In addition to the condition (first condition) that the detection temperature difference $\Delta T$ is greater than the predetermined threshold $\Delta T_{th}$, there may be added the following conditions as the condition for switching the calculation control (the operation mode) from the coordinated calculation control to the independent calculation control. For instance, a second condition is that the calculated current limit value $I_{lim}$, is less than a threshold current value $I_{th}$. In other words, the second condition is that the tentative limit value $I_1$ or the tentative limit value $I_2$ is less than the threshold current value $I_{th}$. The threshold current value $I_{th}$ is set so as to be greater than the minimum value $I_{min}$ and less than the maximum value $I_{max}$ (FIG. 8). In this configuration, the coordinated calculation control is switched to the independent calculation control after the current limit value has been actually lowered by the current limiting control. Thus, the addition of the second condition to the switching condition enables the steering ECU 5 to switch the calculation control from the coordinated calculation control to the independent calculation control in a situation in which the drift fault actually influences the current value of the steering current. Owing to the addition of the second condition, the calculation control is not switched from the coordinated calculation control to the independent calculation control in a situation in which the current value of the steering current is not influenced, namely, in a situation in which the current limit value does not change even if the calculation control is switched from the coordinated calculation control to the independent calculation control.

Similarly, there may be added a third condition that the detection temperature $T_1$ or the detection temperature $T_2$ is higher than a predetermined temperature $T_{ps}$. The predetermined temperature $T_{ps}$ may be a temperature in the limit value map of FIG. 3 not lower than the threshold temperature $T_{th}$ and less than a temperature corresponding to the minimum value $I_{min}$. Alternatively, the predetermined temperature $T_{ps}$ may be a temperature slightly lower than the threshold temperature $T_{th}$, as illustrated in the limit value map of FIG. 8. As described above with respect to the second condition, the addition of the third condition enables the steering ECU 5 to switch the calculation control from the coordinated calculation control to the independent calculation control in a situation in which the current value of the steering current is actually influenced or in a situation in which the current value of the steering current will be highly probably influenced.

Figure 9:
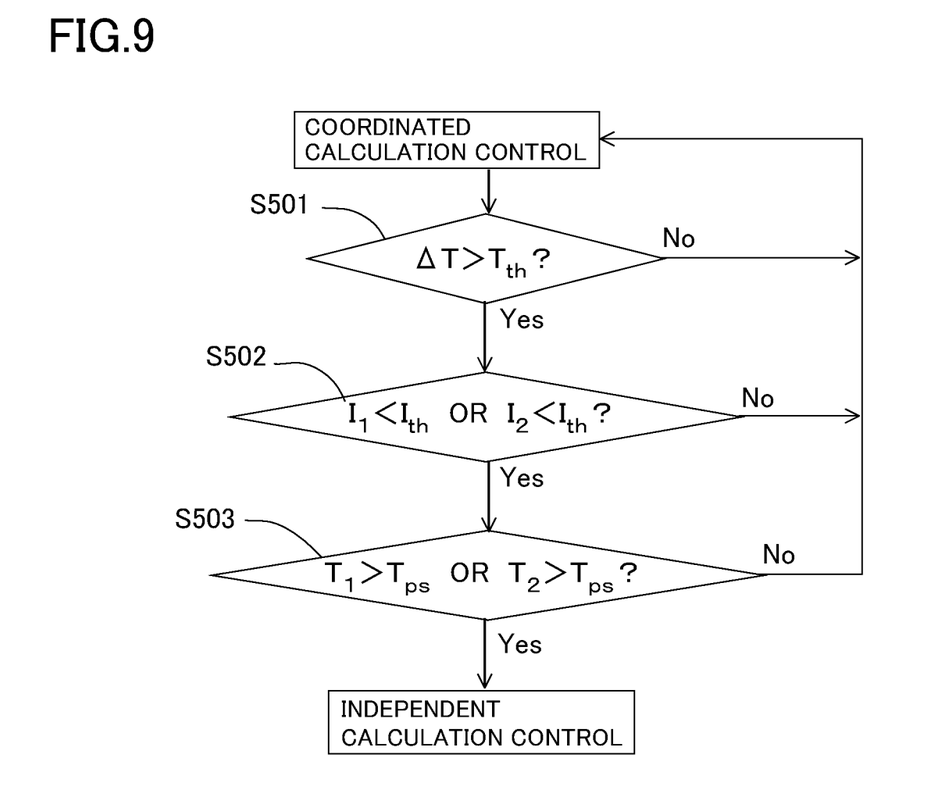
FIG. 9 is a flowchart relating to a switchover of calculation controls in the embodiment.

The steering ECU 5 may be configured to switch the calculation control from the coordinated calculation control to the independent calculation control when the three conditions are satisfied (S501: Yes, S502: Yes, S503: Yes), as illustrated in FIG. 9, for instance. This configuration enables the steering ECU 5 to switch the calculation control from the coordinated calculation control to the independent calculation control in more suitable situations. As described above, the switching conditions for switching the calculation control from the coordinated calculation control to the independent calculation control may include the second condition and/or the third condition, in addition to the first condition as an essential condition.

Modified Embodiment

Figure 10:
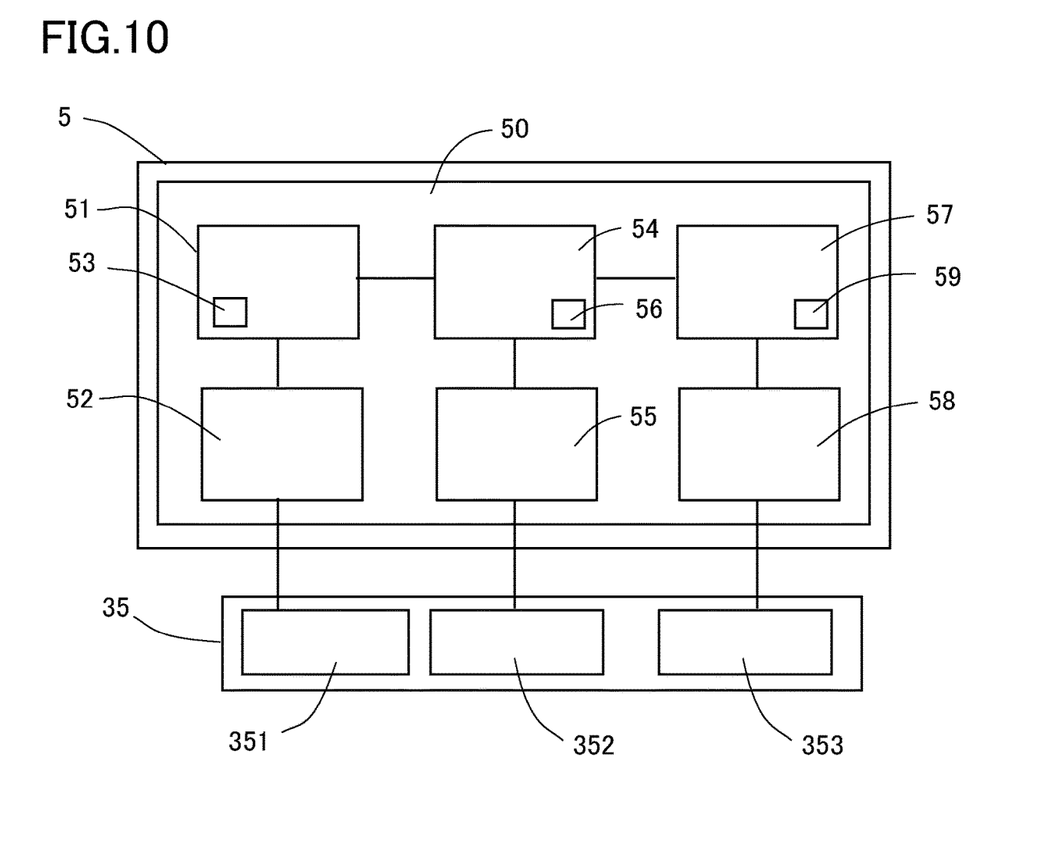
FIG. 10 is a view illustrating a configuration of a steering ECU in a modified embodiment.

The present disclosure is not limited to the configuration described above. For instance, the steering ECU 5 may include three or more microcomputers. The steering ECU 5 may include three or more sets of the microcomputer, the temperature sensor, and the drive circuit. For instance, as illustrated in FIG. 10, the steering ECU 5 may additionally include a third microcomputer 57, a third drive circuit 58, and a third temperature sensor 59. In this modified embodiment, the first microcomputer 51 is a master microcomputer, and each of the second microcomputer 54 and the third microcomputer 57 is a slave microcomputer, for instance. The third microcomputer 57 operates in the same way as the second microcomputer 54 of the embodiment illustrated above. The third temperature sensor 59 is disposed in the third microcomputer 57.

The third microcomputer 57 calculates a current value of a third steering current. In the coordinated calculation control, each of the second microcomputer 54 and the third microcomputer 57 utilizes the calculated value $J_1$ of the first microcomputer 51 for calculating the steering current, instead of the calculated value calculated by itself. The third microcomputer 57 calculates a tentative limit value $I_3$ corresponding to a detection temperature $T_3$ of the third temperature sensor 59 based on the limit value map.

In the coordinated calculation control, each microcomputer 51, 54, 57 sets, as the current limit value, the lowest one of the tentative limit values $I_1, I_2, I_3$, i.e., $\min(I_1, I_2, I_3)$. In other words, each microcomputer 51, 54, 57 sets the current limit value corresponding to the highest one of the detection temperatures $T_1, T_2, T_3$. Each microcomputer 51, 54, 57 sets, as the command value, a lower one of the calculated value $J_1$ and the current limit value $\min(I_1, I_2, I_3)$. The current value of the steering current supplied to the steering motor 35 is a sum of the first steering current, the second steering current, and the third steering current. Thus, the current value of the steering current calculated by each microcomputer 51, 54, 57 is equal to a value obtained by multiplying the command value by ⅓, i.e., the command value×⅓.

In the independent calculation control, the third microcomputer 57 independently calculates the current value of the third steering current, like the first microcomputer 51 and the second microcomputer 54. The third microcomputer 57 calculates a calculated value $J_3$ based on the steering request. The third microcomputer 57 sets, as a third current limit value $I_{lim3}$, the current limit value corresponding to the detection temperature $T_3$ of the third temperature sensor 59. The third microcomputer 57 sets, as the command value, a lower one of the calculated value $J_3$ and the third current limit value $I_{lim3}$. The third microcomputer 57 sets, as the current value of the third steering current, a value obtained by multiplying the command value by ⅓, i.e., a third final calculated value. The third microcomputer 57 controls the third drive circuit 58 such that the third steering current is supplied to a third winding wire 353 of the steering motor 35.

The condition for switching the calculation controls, namely, the first condition, is that a first detection temperature difference $\Delta T_1$ that is a difference between the detection temperature $T_1$ and the detection temperature $T_2$, a second detection temperature difference $\Delta T_2$ that is a difference between the detection temperature $T_2$ and the detection temperature $T_3$, or a third detection temperature difference $\Delta T_3$ that is a difference between the detection temperature $T_3$ and the detection temperature $T_1$ is greater than the predetermined threshold $\Delta T_{th}$ ($\Delta T_1 > \Delta T_{th}$, $\Delta T_2 > \Delta T_{th}$, or $\Delta T_3 > \Delta T_{th}$). This configuration also offers advantages similar to those in the embodiment illustrated above.

There may be added, to the switching condition, a second condition and/or a third condition described below. The second condition is a condition that any of the tentative limit values $I_1, I_2, I_3$ is less than the threshold current value $I_{th}$, for instance. The third condition is a condition that any of the detection temperatures $T_1, T_2, T_3$ is higher than the predetermined temperature $T_{ps}$. This configuration also enables the calculation control to be switched from the coordinated control to the independent control in more suitable situations such as a situation in which the drift fault influences the current limit value to be set.

Summary of Configuration of Present Embodiment

The steering system 1 according to the present embodiment is a steer-by-wire steering system. The steering system 1 includes: the front-wheel steering device 3 including the steering motor 35 and configured to steer the front wheels 10F mechanically independently of the operation force of the steering wheel 21; and the steering ECU5, as one example of a controller, configured to supply the steering current to the steering motor 35 based on the steering request to control the steering motor 35. The steering ECU 5 includes: a plurality of microcomputers 51, 54, which functions as a plurality of calculating portions, communicably connected to each other, each of the microcomputers 51, 54 being configured to calculate the current value of the steering current based on the steering request; a plurality of drive circuits 52, 55 respectively corresponding to the plurality of microcomputers 51, 54, each of the drive circuits 52, 55 being configured to supply the steering current to the steering motor 35 based on control of a corresponding one of the microcomputers 51, 54; and a plurality of temperature sensors 53, 56 respectively corresponding to the plurality of microcomputers 51, 54, each of the temperature sensors 53, 56 being configured to detect a temperature of a corresponding one of the microcomputers 51, 54. When the detection temperature difference that is a difference between the detection temperatures of the temperature sensors 53, 56 is greater than the predetermined threshold, each of the microcomputers 51, 54 executes the independent calculation control. In the independent calculation control, each of the microcomputers 51, 54 independently calculates and sets the current limit value, which is the upper limit value of the steering current, based on the detection temperature of a corresponding one of the temperature sensors 53, 56, irrespective of the detection temperature of the other of the temperature sensors 53, 56.

When the detection temperature difference is not greater than the predetermined threshold, each of the microcomputers 51, 54 executes the coordinated calculation control to calculate and set the current limit value common to the microcomputers 51, 54 based on the highest one of the detection temperatures of the temperature sensors 53, 56.

When the detection temperature difference is greater than the predetermined threshold (the first condition), the current limit value that corresponds to the detection temperature of at least one of the temperature sensor 53, 56 is less than the threshold current value $I_{th}$ (the second condition), and/or the detection temperature of at least one of the temperature sensor 53, 56 is higher than the predetermined temperature $T_{ps}$ (the third condition), each of the microcomputers 51, 54 executes the independent calculation control.

In the present embodiment, each of the microcomputers 51, 54 is a microcomputer including a CPU and a memory. The microcomputers 51, 54 are disposed in the identical electronic control unit 5 (ie., in the identical casing) and/or on the identical board 50. In other words, the microcomputers 51, 54 are disposed in the single common electronic control unit 5 (i.e., in the single common casing) and/or on the single common board 50. The steering ECU 5 pre-stores the limit value map representing a relationship between the detection temperature of the temperature sensor and the current limit value. Each of the microcomputers 51, 54 is configured to calculate the current limit value based on the limit value map.

Configuration in which Controller Includes Two Calculating Portions

In the configuration illustrated in "Summary of Configuration of Present Embodiment", "the plurality of calculating portions" may be constituted by the first microcomputer 51 configured to calculate the current value of the first steering current and the second microcomputer 54 configured to calculate the current value of the second steering current. In this case, "the plurality of temperature sensors" includes the first temperature sensor 53 configured to detect the temperature of the first microcomputer 51 and the second temperature sensor 56 configured to detect the temperature of the second microcomputer 54. Further, "the plurality of drive circuits" is constituted by the first drive circuit 52 configured to supply the first steering current to the steering motor 35 based on control of the first microcomputer 51 and the second drive circuit 55 configured to supply the second steering current to the steering motor 35 based on control of the second microcomputer 54. When the detection temperature difference $\Delta T$ that is a difference between the detection temperature of the first temperature sensor 53 and the detection temperature of the second temperature sensor 56 is greater than the predetermined threshold $\Delta T_{th}$, each of the microcomputers 51, 54 executes the independent calculation control. In the independent calculation control, the first microcomputer 51 calculates the current limit value that limits the first steering current, i.e., the first current limit value $I_{lim1}$, based on the detection temperature of the first temperature sensor 53, irrespective of the detection temperature of the second temperature sensor 56. In the independent calculation control, the second microcomputer 54 calculates the current limit value that limits the second steering current, i.e., the second current limit value $I_{lim2}$, based on the detection temperature of the second temperature sensor 56, irrespective of the detection temperature of the first temperature sensor 53.

When the detection temperature difference $\Delta T$ is not greater than the predetermined threshold $\Delta T_{th}$, each of the microcomputers 51, 54 executes the coordinated calculation control. In the coordinated calculation control, each of the microcomputers 51, 54 calculates the current limit value common to the microcomputers 51, 54 based on a higher one of the detection temperature of the first temperature sensor 53 and the detection temperature of the second temperature sensor 56.

Configuration in Which Controller Includes Three Calculating Portions

In the configuration illustrated in "Summary of Configuration of Present Embodiment", "the plurality of calculating portions" may be constituted by the first microcomputer 51 configured to calculate the current value of the first steering current, the second microcomputer 54 configured to calculate the current value of the second steering current, and the third microcomputer 57 configured to calculate the current value of the third steering current. In this case, "the plurality of temperature sensors" includes the first temperature sensor 53 configured to detect the temperature of the first microcomputer 51, the second temperature sensor 56 configured to detect the temperature of the second microcomputer 54, and the third temperature sensor 59 configured to detect the temperature of the third microcomputer 57. Further, "the plurality of drive circuits" is constituted by the first drive circuit 52 configured to supply the first steering current to the steering motor 35 based on control of the first microcomputer 51, the second drive circuit 55 configured to supply the second steering current to the steering motor 35 based on control of the second microcomputer 54, and the third drive circuit 58 configured to supply the third steering current to the steering motor 35 based on control of the third microcomputer 57. Each of the microcomputers 51, 54, 57 executes the independent calculation control when the first detection temperature difference that is a difference between the detection temperature of the first temperature sensor 53 and the detection temperature of the second temperature sensor 56, the second detection temperature difference that is a difference between the detection temperature of the second temperature sensor 56 and the detection temperature of the third temperature sensor 59, or the third detection temperature difference that is a difference between the detection temperature of the third temperature sensor 59 and the detection temperature of the first temperature sensor 53 is greater than the predetermined threshold. When the detection temperature difference that is a difference between the detection temperatures of any two of the temperature sensors 53, 56, 59 is greater than the predetermined threshold, each of the microcomputers 51, 54, 57 executes the independent calculation control. In the independent calculation control, each of the microcomputers 51, 54, 57 independently calculates and sets the current limit value, which is the upper limit value of the steering current, based on the detection temperature of one of the temperature sensors 53, 56, 59 corresponding to itself, irrespective of the detection temperatures of the temperature sensors 53, 56, 59 other than the one of the temperature sensors 53, 56, 59 corresponding to itself.

In the independent calculation control, the first microcomputer 51 calculates the current limit value that limits the first steering current, i.e., the first current limit value $I_{lim1}$, based on the detection temperature of the first temperature sensor 53, irrespective of the detection temperature of the second temperature sensor 56 and the detection temperature of the third temperature sensor 59. In the independent calculation control, the second microcomputer 54 calculates the current limit value that limits the second steering current, i.e., the second current limit value $I_{lim2}$, based on the detection temperature of the second temperature sensor 56, irrespective of the detection temperature of the first temperature sensor 53 and the detection temperature of the third temperature sensor 59. In the independent calculation control, the third microcomputer 57 calculates the current limit value that limits the third steering current, i.e., the third current limit value $I_{lim3}$, based on the detection temperature of the third temperature sensor 59, irrespective of the detection temperature of the first temperature sensor 53 and the detection temperature of the second temperature sensor 56.

When all of the first detection temperature difference, the second detection temperature difference, and the third detection temperature difference are not greater than the predetermined threshold $\Delta T_{th}$, each of the microcomputers 51, 54, 57 executes the coordinated calculation control. In the coordinated calculation control, each of the microcomputers 51, 54, 57 calculates the current limit value common to the microcomputers 51, 54, 57 based on the highest one of the detection temperature of the first temperature sensor 53, the detection temperature of the second temperature sensor 56, and the detection temperature of the third temperature sensor 59.

Modifications

The "calculating portion" is not limited to the microcomputer but may be an ECU, for instance. That is, the controller may be constituted by a plurality of ECUs. For instance, the steering system 1 may include a first ECU as one example of a first calculating portion, a first temperature sensor configured to detect a temperature of the first ECU, a first drive circuit disposed in the first ECU, a second ECU as one example of a second calculating portion, a second temperature sensor configured to detect a temperature of the second ECU, and a second drive circuit disposed in the second ECU. In this case, the first temperature sensor and the second temperature sensor are disposed neither on an identical board nor in an identical ECU (electronic control unit). However, there are obtained advantages similar to those obtained when the temperature sensors are disposed in the identical ECU or on the identical board are obtained if the temperature sensors are disposed such that a difference in the detection temperature is less likely to be generated between the temperature sensors in the normal condition, such as when the first ECU is disposed near the second ECU, e.g., side by side. In a case where the difference in the detection temperature is generated between the temperature sensors in the normal condition depending on the layout of the first ECU and the second ECU, a certain degree of advantages are obtained by setting the predetermined threshold in consideration of the difference. In view of ease of setting the threshold, etc., the temperature sensors are preferably disposed such that the difference in the detection temperature therebetween in the normal condition falls within a predetermined range.

The steering system 1 illustrated above includes one steering motor, which is a drive source of the steering actuator 30. The steering system 1 may include a plurality of steering motors corresponding to the number of the calculating portions (e.g., the microcomputers). A plurality of temperature sensors may be disposed in the microcomputer. In this case, the microcomputer may utilize an average value of the detection temperatures as the temperature of the microcomputer in question. The control according to the present embodiment may be applied to the steering control of the rear wheels 10R. Details of various calculations described above may be performed otherwise unless deviating from the technical concept of the present disclosure. The limit value map may be set to be different from those of FIGS. 3 and 8. The microcomputer may also be referred to as a microcontroller.

The present embodiment may be described as follows. The steering system 1 is of a steer-by-wire type and includes: a steering device including a steering motor and configured to steer one or more wheels mechanically independently of an operation force of an operating member; and a controller configured to supply a first steering current and a second steering current to the steering motor based on a steering request to control the steering motor. The controller includes a first calculating portion configured to calculate a current value of the first steering current, a first temperature sensor configured to detect a temperature of the first calculating portion, a second calculating portion communicably connected to the first calculating portion and configured to calculate a current value of the second steering current, and a second temperature sensor configured to detect a temperature of the second calculating portion. When a detection temperature difference that is a difference between the detection temperature of the first temperature sensor and the detection temperature of the second temperature sensor is greater than a predetermined threshold, the controller executes an independent calculation control in which a first current limit value, which is an upper limit value of the first steering current, is calculated based on the detection temperature of the first temperature sensor irrespective of the detection temperature of the second temperature sensor, and a second current limit value, which is an upper limit value of the second steering current, is calculated based on the detection temperature of the second temperature sensor irrespective of the detection temperature of the first temperature sensor. When the detection temperature difference is not greater than the predetermined threshold, the controller executes a coordinated calculation control in which the first current limit value and the second current limit value are set to a common value based on the detection temperature of the first temperature sensor and the detection temperature of the second temperature sensor. The configuration in which the steering system 1 includes three or more calculating portions can be similarly described.

What is claimed is:

1. A steer-by-wire steering system, comprising:
a steering device including a steering motor and configured to steer one or more wheels mechanically independently of an operation force of an operating member; and
a controller configured to supply a steering current to the steering motor based on a steering request to control the steering motor,
wherein the controller includes:
a plurality of microcomputers communicably connected to each other, each of the plurality of microcomputers being configured to calculate a current value of the steering current based on the steering request;
a plurality of drive circuits respectively corresponding to the plurality of microcomputers, each of the plurality of drive circuits being configured to supply the steering current to the steering motor based on control of a corresponding one of the plurality of microcomputers; and
a plurality of temperature sensors respectively corresponding to the plurality of microcomputers, each of the plurality of temperature sensors being configured to detect a temperature of a corresponding one of the plurality of microcomputers,
wherein, when a detection temperature difference that is a difference between detection temperatures of any two of the plurality of temperature sensors is greater than a predetermined threshold, each of the plurality of microcomputers executes an independent calculation control to independently calculate and set a current limit value, which is an upper limit value of the steering current, based on a detection temperature of one of the plurality of temperature sensors corresponding to itself, irrespective of detection temperatures of one or more of the plurality of temperature sensors other than the one of the plurality of temperature sensors corresponding to itself.

2. The steer-by-wire steering system according to claim 1, wherein, when the detection temperature difference is not greater than the predetermined threshold, each of the plurality of microcomputers executes a coordinated calculation control to calculate and set the current limit value common to the plurality of microcomputers based on the highest one of the detection temperatures of all of the plurality of temperature sensors.

3. The steer-by-wire steering system according to claim 1, wherein each of the plurality of microcomputers executes the independent calculation control when the detection temperature difference is greater than the predetermined threshold and the current limit value that corresponds to the detection temperature of at least one of the plurality of temperature sensors is less than a predetermined threshold current value.

4. The steer-by-wire steering system according to claim 1, wherein each of the plurality of microcomputers executes the independent calculation control when the detection temperature difference is greater than the predetermined threshold and the detection temperature of at least one of the plurality of temperature sensors is higher than a predetermined temperature.

5. The steer-by-wire steering system according to claim 1, wherein each of the plurality of microcomputers executes the independent calculation control when the detection temperature difference is greater than the predetermined threshold, the current limit value that corresponds to the detection temperature of at least one of the plurality of temperature sensors is less than a predetermined threshold current value, and the detection temperature of at least one of the plurality of temperature sensors is higher than a predetermined temperature.

6. The steer-by-wire steering system according to claim 1, wherein the plurality of microcomputers and the plurality of temperature sensors are disposed in an identical electronic control unit.

7. The steer-by-wire steering system according to claim 1, wherein the plurality of microcomputers and the plurality of temperature sensors are disposed on an identical board.

8. The steer-by-wire steering system according to claim 1,
wherein the controller pre-stores a limit value map representing a relationship between the detection temperature of the temperature sensor and the current limit value, and
wherein each of the plurality of microcomputers is configured to calculate the current limit value based on the limit value map.

9. The steer-by-wire steering system according to claim 1,
wherein the plurality of microcomputers is constituted by a first microcomputer configured to calculate a current value of a first steering current and a second microcomputer configured to calculate a current value of a second steering current,
wherein the plurality of temperature sensors includes a first temperature sensor configured to detect a temperature of the first microcomputer and a second temperature sensor configured to detect a temperature of the second microcomputer,
wherein the plurality of drive circuits is constituted by a first drive circuit configured to supply the first steering current to the steering motor based on control of the first microcomputer and a second drive circuit configured to supply the second steering current to the steering motor based on control of the second microcomputer,
wherein each of the first microcomputer and the second microcomputer executes the independent calculation control when the detection temperature difference that is a difference between the detection temperature of the first temperature sensor and the detection temperature of the second temperature sensor is greater than the predetermined threshold,
wherein, in the independent calculation control, the first microcomputer calculates the current limit value that limits the first steering current based on the detection temperature of the first temperature sensor, irrespective of the detection temperature of the second temperature sensor, and
wherein, in the independent calculation control, the second microcomputer calculates the current limit value that limits the second steering current based on the detection temperature of the second temperature sensor, irrespective of the detection temperature of the first temperature sensor.

10. The steer-by-wire steering system according to claim 9, wherein, when the detection temperature difference is not greater than the predetermined threshold, each of the first microcomputer and the second microcomputer executes a coordinated calculation control to calculate and set the current limit value common to the first microcomputer and the second microcomputer based on a higher one of the detection temperature of the first temperature sensor and the detection temperature of the second temperature sensor.

11. The steer-by-wire steering system according to claim 1,
wherein the plurality of microcomputers is constituted by a first microcomputer configured to calculate a current value of a first steering current, a second microcomputer configured to calculate a current value of a second steering current, and a third microcomputer configured to calculate a current value of a third steering current,
wherein the plurality of temperature sensors includes a first temperature sensor configured to detect a temperature of the first microcomputer, a second temperature sensor configured to detect a temperature of the second microcomputer, and a third temperature sensor configured to detect a temperature of the third microcomputer,
wherein the plurality of drive circuits is constituted by a first drive circuit configured to supply the first steering current to the steering motor based on control of the first microcomputer, a second drive circuit configured to supply the second steering current to the steering motor based on control of the second microcomputer, and a third drive circuit configured to supply the third steering current to the steering motor based on control of the third microcomputer,
wherein each of the first microcomputer, the second microcomputer, and the third microcomputer executes the independent calculation control when a first detection temperature difference that is a difference between the detection temperature of the first temperature sensor and the detection temperature of the second temperature sensor, a second detection temperature difference that is a difference between the detection temperature of the second temperature sensor and the detection temperature of the third temperature sensor, or a third detection temperature difference that is a difference between the detection temperature of the third temperature sensor and the detection temperature of the first temperature sensor is greater than the predetermined threshold,
wherein, in the independent calculation control, the first microcomputer calculates the current limit value that limits the first steering current based on the detection temperature of the first temperature sensor, irrespective of the detection temperature of the second temperature sensor and the detection temperature of the third temperature sensor,
wherein, in the independent calculation control, the second microcomputer calculates the current limit value that limits the second steering current based on the detection temperature of the second temperature sensor, irrespective of the detection temperature of the first temperature sensor and the detection temperature of the third temperature sensor, and wherein, in the independent calculation control, the third microcomputer calculates the current limit value that limits the third steering current based on the detection temperature of the third temperature sensor, irrespective of the detection temperature of the first temperature sensor and the detection temperature of the second temperature sensor.

12. The steer-by-wire steering system according to claim 11, wherein, when all of the first detection temperature difference, the second detection temperature difference, and the third detection temperature difference are not greater than the predetermined threshold, each of the first microcomputer, the second microcomputer, and the third microcomputer executes a coordinated calculation control to calculate the current limit value common to the first microcomputer, the second microcomputer, and the third microcomputer based on the highest one of the detection temperature of the first temperature sensor, the detection temperature of the second temperature sensor, and the detection temperature of the third temperature sensor.

* * * * *